United States Patent [19]
Zimowski

[11] 4,123,852
[45] Nov. 7, 1978

[54] TEACHING DEVICE

[76] Inventor: Vera Zimowski, R.D. #1, Ashville, N.Y. 14710

[21] Appl. No.: 785,413

[22] Filed: Apr. 7, 1977

[51] Int. Cl.² .............................................. G09B 1/20
[52] U.S. Cl. ......................................... 35/62; 35/77; 108/49; D6/138
[58] Field of Search .............. 35/60, 62, 77, 26, 35 A, 35/31 A; 108/49; 248/444, 445; D6/138/181; 273/DIG. 27

[56] References Cited

U.S. PATENT DOCUMENTS

| | | | |
|---|---|---|---|
| D. 210,638 | 3/1968 | Greenfield | D6/181 |
| 776,355 | 11/1904 | Selander | 35/62 X |
| 1,770,955 | 7/1930 | Storm | 108/49 UX |
| 2,741,869 | 4/1956 | Aibel | 108/49 UX |
| 3,168,061 | 2/1965 | Bedol | 108/49 X |
| 3,263,347 | 8/1966 | McCutcheon | 35/60 |
| 3,414,987 | 12/1968 | Lindenauer | 35/60 |
| 3,507,056 | 4/1970 | Finkel | 35/60 |
| 3,592,506 | 7/1971 | Breslow | 35/60 |
| 3,597,854 | 8/1971 | Trimmer | 35/62 X |

OTHER PUBLICATIONS

"Play Table" p. 354 Spiegel 1962 Xmas book.
AFB Standard Watches, pp. 30, 31, Aids and Appliances Catalog, Jul. 1972–June 1973, American Foundation For The Blind.

*Primary Examiner*—Harland S. Skogquist
*Attorney, Agent, or Firm*—Reese Taylor

[57] ABSTRACT

A teaching device is disclosed which permits the utilization of both the visual and tactile senses during the learning process. The device includes a main frame, one end of which carries information conveying means consisting of a rotatable roller having removable covers attached thereto which carry raised figures or symbols such as numbers or letters, for example,. The opposed end of the frame slants away from the first end and carries a work surface suitable for writing purposes. The device also includes a support member which is essentially U-shaped in cross section and is capable of receiving the main frame on its top, whereby the overall device may be utilized as a lap desk, for example.

3 Claims, 6 Drawing Figures

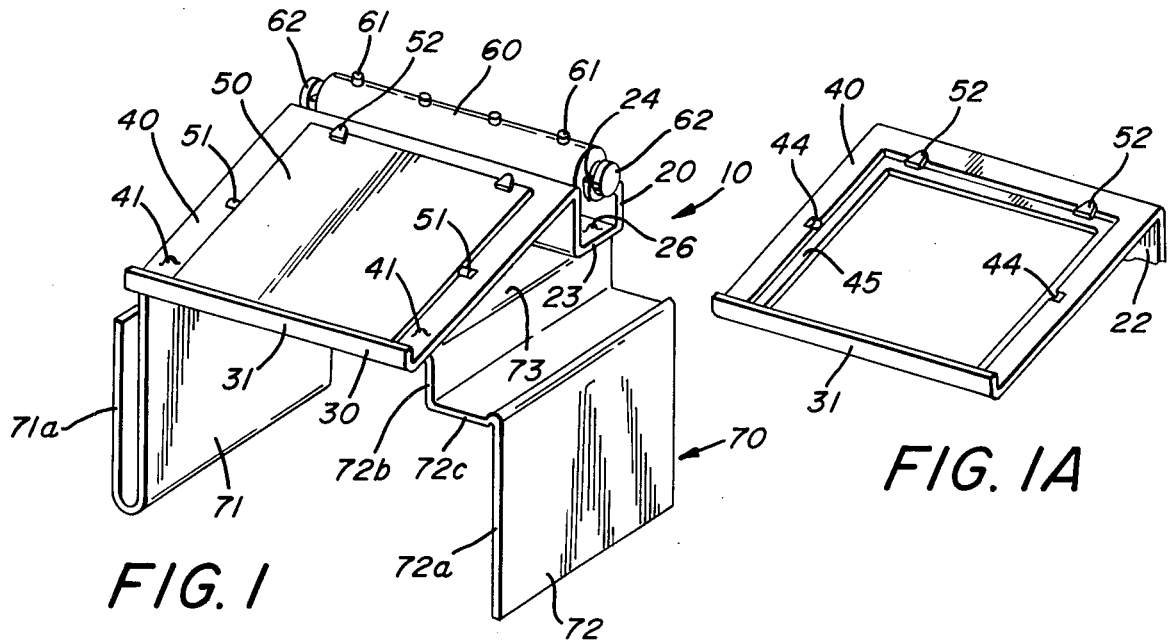
FIG. 1
FIG. 1A
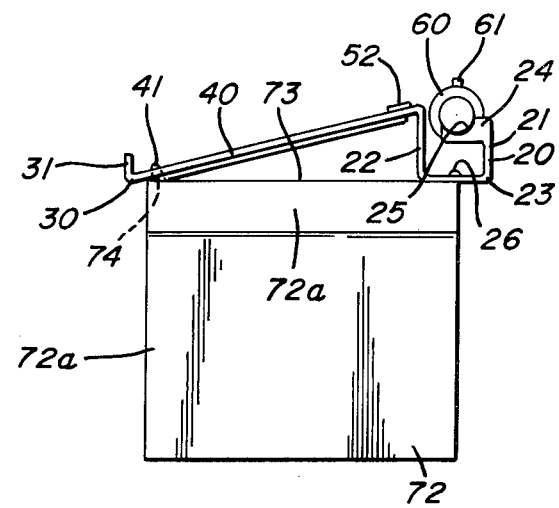
FIG. 1B
FIG. 2
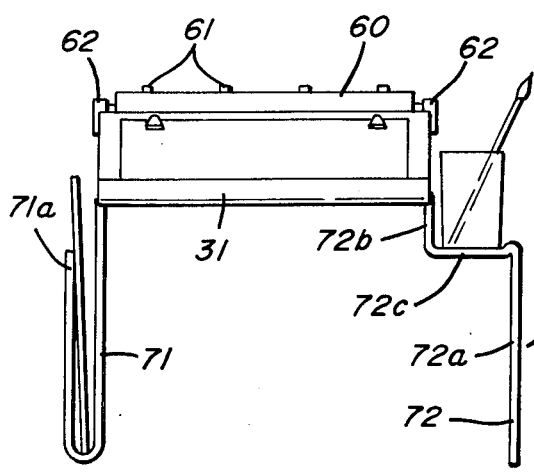
FIG. 3
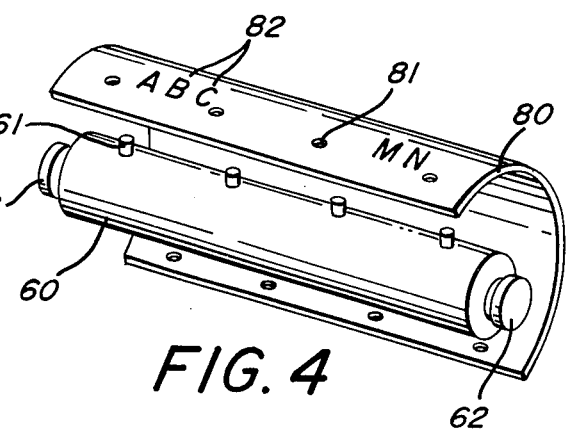
FIG. 4

TEACHING DEVICE

FIELD OF THE INVENTION

This invention relates in general to teaching devices and, in particular, relates to a teaching device wherein the student may exercise both his visual and tactile senses to facilitate the learning process.

DESCRIPTION OF THE PRIOR ART

In the prior art, it is well known to provide a visual representation of a symbol such as a letter or number and to require the student to reproduce it. It is also known to combine a visual display with a writing surface. An example is shown in Hahn U.S. Pat. No. 1,891,414 wherein a display surface containing a calendar is disposed at one end of a frame and a writing surface is combined therewith.

Trimmer U.S. Pat. No. 3,597,854 also discloses a teaching device involving a roller which presents mathematical problems which can be observed visually and then provides pegs which can be manually manipulated to solve the mathematical problem.

None of the known prior art, however, is believed to combine, in one overall assembly, the concept of a roller which can carry replaceable belts having raised indicia such as letters or numbers thereon in combination with a work or writing surface attached thereto so that the student may preceive with both his visual senses and his tactile senses the shape of the letter or number and may immediately transpose that sensation to paper or to slate by writing it. Such a device is believed to have particular utility in teaching children with learning disabilities where conventional teaching aids are often unsatisfactory.

SUMMARY OF THE INVENTION

It has been found that a unique teaching device can be provided for teaching all students, but particularly those with mental or physical learning disabilities, by providing a frame having a rotatable roller at one end and a work surface disposed between that end and the opposed end of the frame. It has been found that the periphery of the roller can be provided with projections which can releasably receive a belt or similar article which contains raised indicia such as letters or numbers, and that the roller can be rotated so that only one row or one symbol is visable at a given time.

It has been found that in this fashion, it is possible for a child to concentrate at least two of his senses on learning the configuration and identification of the symbol; and that by providing the information receiving surface immediately adjacent the information imparting surface, i.e., the roll, that learning will be greatly facilitated.

It has also been found that a support member can be provided for removable reception of the frame, with this support member being of generally U-shaped cross section so that the child can utilize the overall assembly as a "lap" desk or, for that matter, can utilize it on the floor.

It has further been found that the advantages of the overall assembly can be enhanced if the support member is provided with suitable receptacles for receipt of working material such as paper, pencils, etc.

Accordingly, production of an improved teaching device of the character above described becomes the principal object of this invention with other objects thereof becoming more apparent upon a reading of the following brief specification, considered and interpreted in view of the accompanying drawings.

OF THE DRAWINGS

FIG. 1 is a perspective view showing the overall assembly.

FIG. 1A is a partial perspective view showing part of the frame with the working surface removed.

FIG. 1B is a perspective view of the work surface showing the reverse side thereof.

FIG. 2 is a side elevational view of the improved device.

FIG. 3 is a front elevational view of the assembled device.

FIG. 4 is a perspective view of the roll and the belt which attaches thereto.

BRIEF DESCRIPTION OF THE PREFERRED EMBODIMENT

Referring first to FIG. 1, it will be noted that, in general, the improved teaching device includes two subassemblies; namely, the frame, generally indicated by the numeral 10, and the support member, generally indicated by the numeral 70.

Frame 10 has opposed ends 20 and 30, as shown in FIGS. 1 and 2. End 20 consists of a first leg 21 and an opposed leg 22 spaced therefrom, with both legs 21 and 22 disposed in a vertical condition and interconnected by a horizontal bottom leg 23. First leg 21 has an inwardly projecting horizontal support 24 which has a U-shaped notch centrally received therein and adapted to receive the roll 60, as will be described.

The opposed end of the frame 10 has an up-turned flange 31, and the opposed ends 20 and 30 are interconnected by central body portion 40 which essentially consists of a rectangular frame, as more clearly shown in FIG. 1A. The main body portion 40 has a ledge built into its interior opening and indicated by the numeral 45, and also has opposed notches 44, 44.

A work surface 50 is provided and can take the form of either a plane, flat planar surface suitable for receiving paper or can be in the form of a slate suitable for receiving impressions from chalk. This work surface 50 has opposed projections 51, 51 dimensioned and contoured so as to fit into the notches 44, 44 of the body 40 for locating purposes. It will be understood that when the work surface 50 is in place, it will rest on the ledge 45 and be located by means of the notches 44, 44 and projections 51, 51. Also secured to at least one side of the work surface 50 are spring clips 52, 52 suitable for releasably holding paper under tension.

It should be noted that the reversability of the work surface 50 makes it possible, for example, to provide one side thereof with a smooth planar surface suitable for paper reception, and the other side with a slate or chalk board surface so that either side may be used, as desired. Such a surface is illustrated at 53 in FIG. 1B.

Referring next to FIGS. 1 and 4, it will be noted that the roll 60 is an elongate tubular roll member having projecting knobs 62, 62 and can be releasably and rotatably received within the U-shaped notches 25 of arms 24 of end 20 so that the roll can be readily rotated about its longitudinal axis.

Received on the periphery of the roll 60 are a plurality of projections 61, 61 and, with reference to FIG. 4, the belt 80 has matching apertures 81, 81 so that the belt can be releasably secured to the roll. On the surface of the roll are raised indicia 82 which can consist virtually of anything desired. These indicia can be, for example, letters of the alphabet, numbers, or even simple pictures and words.

While the invention is not intended to be limited to any particular material, it has been found that felt or a similar material is suitable. Thus, for example, the visually handicapped child can be readily guided, using the tactile sense, with indicia of this nature. Of course, other materials such as sand paper, for example, could also be used.

Referring again to FIGS. 1 and 2, it will be noted that the overall device also includes a second subassembly including support member 70 which has opposed vertical legs 71 and 72 and an interconnecting top surface 73. Leg 71, as illustrated in FIGS. 1 and 3, for example, has an integral return leg 71a, with this leg projecting upwardly toward the top edge of leg 71 and providing a receptacle for supplies such as books or paper.

The other leg 71, in reality, consists of a first vertical member 72a and a second vertical member 72b interconnected by horizontal member 72c forming a shelf for reception of other work supplies such as pencils, erasers, etc.

It should also be noted that main frame 40 has dimples or distortions 41, 41 in the bottom surfaces thereof adjacent end 30 and that the end 20 of the frame 10 has similar distortions or depressions 26, 26 in horizontal member 23. By like token, the top surface of the horizontal portion of the frame member 70 has raised areas or projections 74, 74 so that when the frame 10 is placed on top of the support member 70, the projections 74, 74 will engage the depressions 41 and 26 to prevent movement of the frame 10 relative of the support 70.

It should also be noted, however, that the frame 10 has independent utility in that it itself could be placed on a conventional table or desk top and utilized in that fashion apart from the support member 70, if desired.

In use or operation of the device, assuming it to be assembled to the configuration of FIG. 1, and further assuming that a belt 80 has been secured to the roll 60, it is merely necessary to rotate the roll to bring the desired indicia or symbol into view, at which time the symbol is both visible to the student and readily available to the student for purposes of touch. The student is then directed to follow the instructions of the teacher in conventional fashion so far as reproducing the symbol on work surface 50.

While a full and complete description of the invention has been set forth in accordance with the dictates of the Patent Statutes, it should be understood that modifications can be resorted to without departing from the spirit hereof or the scope of the appended claims, considered and interpreted in view of the accompany drawings.

Thus, for example, while projections 61, 61 have been described and illustrated for holding the belt 80 on the roll 60, other holding means such as Velcro ® could also be employed.

What is claimed is:

1. A teaching device comprising:
   (A) a frame having first and second ends;
   (B) an exposed information conveying roll
      (1) disposed adjacent said firstend of said frame transversely thereof and
      (2) bearing raised indicia thereon;
   (C) an information receiving work surface
      (1) disposed on said frame between said information conveying roll and said second end of said frame and
      (2) covering substantially all of the surface area thereof;
   (D) a support member having
      (1) opposed legs with top and bottom edges, and
      (2) a top transverse support element interconnecting the top edges of said legs;
   (E) said frame being freely received on said support element; and
   (F) engagement means carried by the bottom surface of said frame and the top surface of said support member, whereby relative shifting there between is prevented.

2. The device of claim 1 wherein one of said legs of said support member has an integral return leg extending along said bottom edge and from said bottom edge toward said top edge.

3. The device of claim 1 wherein one of said legs includes a horizontally disposed offset portion intermediate its top and bottom edges.

* * * * *